United States Patent
Baudu et al.

(10) Patent No.: US 12,366,265 B2
(45) Date of Patent: Jul. 22, 2025

(54) WHEEL BEARING EQUIPPED WITH A SEALING DEVICE WITH GUTTER AND CHICANE

(71) Applicant: NTN EUROPE, Annecy (FR)

(72) Inventors: Alexandre Baudu, Annecy (FR); Vincent Pourroy-Solari, Thônes (FR); Siegfried Ruhland, Annecy (FR)

(73) Assignee: NTN EUROPE, Annecy (FR)

( * ) Notice: Subject to any disclaimer, the term of this patent is extended or adjusted under 35 U.S.C. 154(b) by 0 days.

(21) Appl. No.: 18/262,739

(22) PCT Filed: Dec. 30, 2021

(86) PCT No.: PCT/EP2021/087877
§ 371 (c)(1),
(2) Date: Jul. 25, 2023

(87) PCT Pub. No.: WO2022/161735
PCT Pub. Date: Aug. 4, 2022

(65) Prior Publication Data
US 2024/0426343 A1    Dec. 26, 2024

(30) Foreign Application Priority Data
Jan. 29, 2021    (FR) .................... 2100909

(51) Int. Cl.
*F16C 33/80*    (2006.01)
*B60B 27/00*    (2006.01)
*F16C 33/78*    (2006.01)

(52) U.S. Cl.
CPC ........ *F16C 33/805* (2013.01); *B60B 27/0073* (2013.01); *F16C 33/7823* (2013.01);
(Continued)

(58) Field of Classification Search
CPC ............... F16C 33/7823; F16C 33/783; F16C 33/7883; F16C 33/7886; F16C 33/80; F16C 33/805; F16C 2326/02; B60B 27/0073
See application file for complete search history.

(56) References Cited

U.S. PATENT DOCUMENTS

| | | | |
|---|---|---|---|
| 2003/0016892 A1* | 1/2003 | Vignotto | F16C 33/7883 384/448 |
| 2011/0216993 A1* | 9/2011 | Mason | F16C 33/7813 384/478 |

(Continued)

FOREIGN PATENT DOCUMENTS

| | | | |
|---|---|---|---|
| DE | 102009023041 A1 * | 12/2010 | ......... B60B 27/0005 |
| EP | 2821662 A1 | 1/2015 | |
| FR | 2000720 A1 | 9/1969 | |

OTHER PUBLICATIONS

Machine Translation of DE-102009023041-A1 (Year: 2010).*

(Continued)

*Primary Examiner* — Alan B Waits
(74) *Attorney, Agent, or Firm* — Chiesa Shahinian & Giantomasi PC

(57) ABSTRACT

A wheel bearing is provided with a sealing device comprising in-cluding at least an outer structure and an inner structure together de-limiting a chicane passage having an inlet. The outer structure forms an annular gutter which is open radially outwards. The inlet of the chicane passage and the shrink-fitting portion of the outer structure are situated axially on either side of the gutter. The shrink-fitting portion of the outer structure is situated on one side of a reference plane of the outer ring, perpendicular to the axis of revolution and tangential to the end wall of the outer ring opposite to the chicane passage and to the gutter.

13 Claims, 3 Drawing Sheets

(52) U.S. Cl.
CPC ...... *F16C 33/7883* (2013.01); *F16C 33/7886* (2013.01); *F16C 2326/02* (2013.01)

(56) References Cited

U.S. PATENT DOCUMENTS

2020/0056652 A1\* 2/2020 Krapf .................. F16C 33/7886
2021/0372476 A1\* 12/2021 Kim .................... B60B 27/0073

OTHER PUBLICATIONS

International Search Report and Written Opinion mailed Apr. 25, 2022, in connection with International Patent Application No. PCT/EP2021/087877, (12 pgs. including translation).

\* cited by examiner

WHEEL BEARING EQUIPPED WITH A SEALING DEVICE WITH GUTTER AND CHICANE

CROSS-REFERENCE TO RELATED APPLICATION(S)

This application is a National Stage under 35 U.S.C. 371 of International Patent Application No. PCT/EP2021/087877, filed Dec. 30, 2021, which claims the benefit of priority under 35 U.S.C. 119 to French Patent Application No. 2100909, filed Jan. 29, 2021; the disclosures of all of which are incorporated herein by reference in their entirety

TECHNICAL FIELD OF THE INVENTION

The invention relates to a wheel bearing, in particular a motor vehicle wheel bearing, and in particular, although not exclusively, to a drive wheel bearing.

STATE OF THE PRIOR ART

The electric or hybrid drivetrains of certain motor vehicles reduce the space available for positioning the torque converter of the drive wheels, and have led to the proposal of assemblies in which at least part of the rotational guidance of the wheels overlaps with the torque converter, of the type described for example in the French application FR2000720, unpublished to date. Such assemblies require larger-diameter wheel bearings than those normally found on the market. To guarantee the sealing of such bearings, it is necessary to provide seals. For this purpose, a cassette seal can naturally be considered, housed in a space situated radially directly between the inner and outer ring. However, such a large-diameter seal poses problems that are difficult to solve without increasing the cost of the function. In particular, the seal generates friction between the seal lip and the seat, and this friction increases with diameter, which has a negative impact on resistive torque and operating temperature. On the other hand, a large-diameter joint requires additional assembly precision and reduced manufacturing tolerances. Finally, inserting a cassette seal into the wheel bearing requires two cylindrical seats facing each other on the outer ring and inner ring.

Document DE102009023041 describes a wheel bearing comprising an outer ring and at least one inner ring, which are guided relative to one another around an axis of revolution of the wheel bearing, the wheel bearing further comprising a sealing device, the sealing device comprising at least one outer structure attached to the outer ring and an inner structure attached to the inner ring, the outer structure and the inner structure together delimiting a chicane passage having an inlet. The outer structure features a shrink-fitting portion shrunk onto the outer ring, and forms an annular gutter open radially outwards. The inlet of the chicane passage and the shrink-fitting portion of the outer structure are situated axially on either side of the gutter, the chicane passage and the gutter being situated on the same first side of a reference plane of the outer ring, perpendicular to the axis of revolution and tangent to an end wall of the outer ring. The shrink-fitting portion of the outer structure and the outer ring are situated on a second side of the outer ring reference plane, opposite the first side. The gutter has a side wall that bears entirely against the transverse end face of the outer ring, and the depth of the gutter is limited by the presence of the inner structure. The inner structure also supports an encoder that can be read radially across the bottom of the gutter by a sensor positioned in the gutter.

DISCLOSURE OF THE INVENTION

The aim of the invention is to remedy the disadvantages of the prior art and to offer a wheel bearing which reconciles a large pitch diameter and a satisfactory sealing function from the perspective of technical performance and financial cost.

According to a first aspect of the invention, a wheel bearing is proposed which comprises at least one outer ring and at least one inner ring, which are guided relative to one another around an axis of revolution of the wheel bearing, the wheel bearing further comprising a sealing device, the sealing device comprising at least one outer structure attached to the outer ring and an inner structure attached to the inner ring, the outer structure and the inner structure together delimiting a chicane passage having an inlet, the outer structure having a shrink-fitting portion shrunk onto the outer ring, the inner structure (78) having a shrink-fitting portion shrunk onto a shrink-fit surface of the inner ring. The outer structure forms an annular gutter open radially outwards, the inlet of the chicane passage and the shrink-fitting portion of the outer structure being situated axially on either side of the gutter, the chicane passage and the gutter being situated on a same first side of a reference plane of the outer ring, perpendicular to the axis of revolution and tangent to an end wall of the outer ring, the shrink-fitting portion of the outer structure and the outer ring being situated on a second side of the outer ring reference plane, opposite the first side. The gutter has a bottom and side walls situated axially on either side of the bottom, the side walls being further from the axis of revolution than the bottom.

Positioning the functional portion of the sealing device's outer structure axially outside the reference plane enables the sealing device to incorporate a gutter and a chicane passage, which together provide the bearing with excellent protection of against sprayed materials. The gutter allows liquid to drain away, minimizing exposure at the inlet of the chicane passage. Positioning the inlet of the chicane passage on the side of the gutter opposite the shrink-fitting portion is also particularly advantageous when the space available between the outer ring and inner ring is reduced, for example when the inner ring's raceway is close to the outer ring's reference plane.

The inner structure comprises a flat annular flange projecting radially from the shrink-fitting portion of the inner structure towards the outer ring, positioned opposite and at a short distance from one of the side walls of the gutter. Such a flange allows grease to be confined within the volume defined between the outer ring and the inner ring, enabling a seal lip to be eliminated (or its contact pressure reduced) if necessary, thus contributing to a reduction in friction torque. It can also be used to support an encoder, which is then positioned to be read by a sensor housed partly in the gutter.

A second aspect of the invention relates to a plain or rolling bearing comprising at least one inner ring and at least one outer ring, the inner ring and the outer ring being rotatable relative to each other about an axis of revolution of the bearing.

The inner ring has:
at least one annular guideway,
an axial end face facing in a reference axial direction parallel to the axis of revolution, the axial end face of the inner ring being tangent to an inner ring reference plane perpendicular to the axis of revolution and situated axially at a distance from the inner ring guideway in the reference direction, an axially extending shrink-fit surface between the axial end face of the inner ring and the guideway of the inner ring.

The outer ring has:

at least one annular guideway opposite the inner ring guideway, an axial end face facing in the axial reference direction, the axial end face of the outer ring being tangent to a reference plane of the outer ring, perpendicular to the axis of revolution and situated axially at a distance from the guideway of the outer ring in the reference direction, an axially extending shrink-fit surface between the axial end face of the outer ring and the guideway of the outer ring.

The bearing further comprises a sealing device, the sealing device comprising at least:

an outer structure integral with the outer ring, the outer structure comprising at least one shrink-fitting portion shrunk onto the shrink-fit surface of the outer ring and at least one functional portion situated on one side of the reference plane of the outer ring opposite the shrink-fitting portion of the outer structure, and an inner structure integral with the inner ring, the inner structure comprising at least one shrink-fitting portion shrunk onto the shrink-fit surface of the inner ring and at least one functional portion situated on one side of the reference plane of the inner ring opposite the shrink-fitting portion of the inner structure.

According to this second aspect of the invention, the functional portion of the outer structure integral with the outer ring forms a gutter open radially outwards, with at least part of the gutter axially overlapping at least part of the inner ring's shrink-fit surface. Positioning a gutter at least partially in the space between the inner ring reference plane and the outer ring reference plane prevents the gutter from having a negative impact on the bearing's axial dimensions.

The outer structure and the inner structure can preferably together delimit a chicane passage having an inlet, the inlet of the chicane passage and the shrink-fitting portion of the outer structure preferably being situated axially on either side of the gutter, the chicane passage and the gutter preferably being situated on the same first side of the reference plane of the outer ring, the shrink-fitting portion of the outer structure and the outer ring preferably being situated on a second side of the reference plane of the outer ring, opposite the first side.

Alternatively, and similarly to the first aspect of the invention, the inner structure may comprise a flat annular flange projecting radially from the shrink-fitting portion of the inner structure towards the outer ring, positioned opposite and at a short distance from one of the side walls of the gutter. Such a flange allows grease to be confined within the volume defined between the outer ring and the inner ring, enabling a seal lip to be eliminated (or its contact pressure reduced) if necessary, thus contributing to a reduction in friction torque. It can also be used to support an encoder, which is then positioned to be read by a sensor housed partly in the gutter.

The bearing according to this second aspect of the invention can be a rolling bearing, and in particular constitute a wheel bearing. The invention also relates to a motor vehicle wheel support device, comprising a bearing according to the second aspect of the invention, the inner ring being a rotating ring, preferably a wheel hub or a ring integral with a wheel hub, and the outer ring is a fixed ring having an interface for attachment to a wheel support, in particular a wheel pivot.

Naturally, various embodiments, discussed below, can be envisaged, which apply both to the wheel bearing according to the first aspect of the invention and, where applicable, to the plain or rolling bearing according to the second aspect of the invention.

In one embodiment, the chicane passage is delimited by a chicane wall of the outer structure and a chicane wall of the inner structure. Preferably, the chicane wall of the outer structure is situated axially between the reference plane of the outer ring and the chicane wall of the inner structure.

In one embodiment, the gutter is situated axially between the shrink-fitting portion of the outer structure and the chicane wall of the inner structure. The space surrounded by the gutter and situated between the gutter and the axis of revolution is not occupied by the chicane wall of the outer structure and is free to accommodate other components of the wheel bearing, for example part of the inner ring, and in particular a shrink-fit surface of the inner ring on which a shrink-fitting portion of the inner structure is shrunk.

In one embodiment, the chicane wall of the outer structure forms several additional gutters, situated inside the chicane passage. Assuming the outer ring is fixed, the gutters limit the penetration of pollutants into the chicane passage, and guide any pollutants that may still have entered by gravity back to the chicane passage inlet.

In one embodiment, the chicane wall of the inner structure forms several frustoconical walls facing the axis of revolution, each converging towards an apex further from the reference plane than the inlet. When the inner ring is a rotating ring intended to rotate with the wheel hub, such an arrangement enables any pollutants that may have penetrated inside the chicane passage to be centrifuged away, guiding them towards the inlet of the chicane passage. Ideally, the gutters in the chicane wall of the outer structure are combined with the truncated cone walls of the inner chicane wall, for optimum pollutant removal.

In one embodiment, the chicane wall of the outer structure forms several annular ribs of the outer structure, while the chicane wall of the inner structure forms several annular ribs of the inner structure, which are interposed in interspaces between the annular ribs of the outer structure.

In one embodiment, the inlet portion of the chicane wall of the inner structure is cylindrical, or frustoconical, converging towards an apex further from the reference plane than the inlet. In one embodiment, the inlet portion of the chicane wall of the outer structure is cylindrical, or frustoconical, converging towards an apex further from the reference plane than the inlet;

In one embodiment, the inlet of the chicane passage faces axially towards the gutter, and more generally towards the outer ring, which acts as a screen against splashing.

The bottom of the gutter is preferably closer to the axis of revolution than the inlet of the chicane passage. The inlet of the chicane passage preferably opens onto a radially outer perimeter of one of the gutter's side walls.

In one embodiment, the outer ring forms at least one raceway, the inner ring forming at least one raceway situated opposite the outer ring raceway and, together with the outer ring raceway, delimiting an inner volume of the wheel bearing open onto a sealing volume delimited by the outer structure of the sealing device and by the inner structure of the sealing device, the wheel bearing comprising at least one row of rolling bodies able to roll on the outer ring raceway and the inner ring raceway so as to allow relative rotational movement between the inner ring and the outer ring about an axis of revolution. The inlet of the chicane passage is further from the axis of revolution than a pitch circle defined by the row of rolling elements.

In one embodiment, the sealing device further comprises a resiliently deformable seal lip. The seal lip is preferably attached to a first of the inner or outer structures and comes into sliding contact against a seal seat formed on a second of the inner or outer structures. The seal lip and seal seat are preferably situated in the sealing volume.

According to a particularly advantageous embodiment, several of the following conditions are fulfilled:
the seal seat is closer to the axis of revolution than the inlet of the chicane passage;
the joint seat is closer to the axis of revolution than the pitch circle defined by the row of rolling elements;
the seal seat is closer to the axis of revolution than a raceway bottom of the inner ring raceway;
the seal seat is closer to the axis of revolution than a shrink-fitting portion of the inner structure, shrunk onto a shrink-fit surface of the inner ring.

This limits the circumference of the seal seat, and hence the friction torque between seal lip and seal seat.

Preferably, the seal lip is situated on the first side of the outer ring reference plane.

In one embodiment, the shrink-fitting portion of the outer structure is shrunk onto a radially inward-facing shrink-fit surface of the outer ring, which is at least partially situated axially between the raceway of the outer ring and the reference plane. Alternatively, the shrink-fit surface of the outer ring can be turned radially outwards.

In one embodiment, the shrink-fit surface of the outer ring is further from the axis of revolution than the pitch circle of the row of rolling elements, and optionally further from the axis of revolution than a raceway bottom of the outer ring raceway.

In one embodiment, the outer structure comprises a rigid frame, for example made of metal, particularly sheet metal, or plastic, forming the shrink-fitting portion. The frame can then be designed to form the gutter. The frame can also be designed to form the chicane wall of the outer structure.

In one embodiment, the inner ring has an axial end face facing in the axial reference direction. The axial end face of the inner ring can protrude from the axial end face of the outer ring in the axial reference direction. In one embodiment, the gutter is situated axially on either side of a reference plane of the inner ring, perpendicular to the axis of revolution and tangent to the axial end face of the inner ring.

Preferably, several of the following arrangements are created:
the outer ring has an interface for attachment to a strut,
the inner ring forms a wheel hub or is provided with an interface for attachment to a wheel hub,
the inner ring has an interface for supporting, securing or shrink-fitting onto a torque converter,
the shrink-fitting portion is cylindrical,
the outer ring is made of one piece, and/or
the outer ring has an additional raceway positioned opposite and at a distance from an additional raceway formed on the inner ring or on a wheel hub integral with the inner ring.

BRIEF DESCRIPTION OF FIGURES

Other features and advantages of the invention will become apparent on reading the following description, with reference to the appended figures, which show.

For greater clarity, identical or similar elements are identified by identical reference signs in all of the Figures.

DETAILED DESCRIPTION OF EMBODIMENTS

Figure 1:
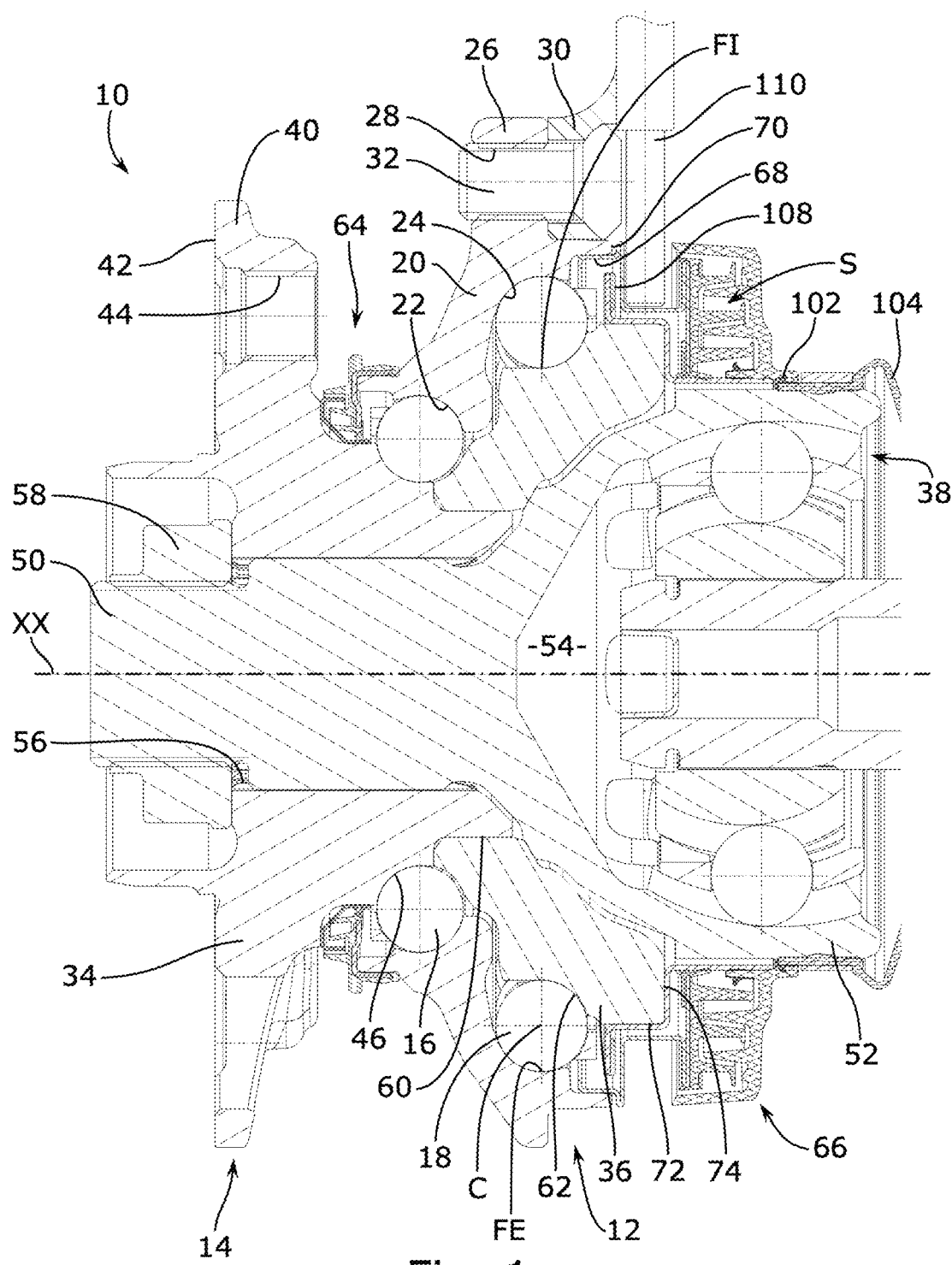
FIG. 1: An axial cross-sectional view of a wheel support assembly comprising a wheel bearing according to a first embodiment of the invention.

FIG. 1 shows a motor vehicle drive wheel assembly 10, comprising a fixed subassembly 12, intended to be secured to a suspension member of a motor vehicle (not shown) and defining an axis of rotation XX, a rotating subassembly 14, capable of rotating about the axis of rotation XX inside the fixed subassembly 12, and guiding rolling bodies 16, 18 between the rotating subassembly 14 and the fixed subassembly 12.

The fixed sub-assembly 12 is here constituted by a single-piece solid metal outer ring 20 on which are formed in this embodiment two coaxial outer raceways 22, 24 defining the axis of revolution XX, one of the outer raceways 22 being intended to be positioned on an outer side of the vehicle, and the other 24 being intended to be positioned on an inner side of the vehicle, i.e. closer to a median longitudinal vertical plane of the vehicle. The outer ring further comprises at least one attachment clamp 26 extending radially outward, in which bores 28 are formed for attaching the attachment clamp 26 to a suspension member 30, in this case a strut pivot, via attachment elements 32.

The rotating sub-assembly 14 comprises a wheel hub 34, which forms an inner ring on the outside of the vehicle, a second inner ring 36 on the inside of the vehicle and a torque converter 38.

The wheel hub 34 is a solid single-piece metal part, which comprises a flange 40 for attaching a drive wheel rim and a brake disc. The flange 40 has a flat face 42 bearing the brake disc or wheel rim, and is provided with attachment bores 44, allowing the insertion of attachment elements of the rim and/or of the brake disc. The wheel hub 34 has a first inner raceway 46 facing the first outer raceway 22.

The torque converter 38 is a solid one-piece metal part, which has a solid protruding end portion 50 and a flared middle portion 52 delimiting a cavity 54, acting as a constant-velocity joint. The protruding portion 50 of the torque converter 38 is splined and mounted free, fitted or shrunk in a splined tubular cavity 56 of the wheel hub 34, forming a splined contact interface. Furthermore, FIG. 1 shows means for attaching the torque converter 38 and the wheel hub 34, which for example implement a nut 58 screwed to a threaded end of the protruding portion 50, and bearing against a shoulder of the wheel hub 34. The inner bearing ring 36 on the inside of the vehicle is shrunk onto a cylindrical shrink-fit surface 60 of the wheel hub 34 and clamped in the axial direction between the wheel hub 34 and the torque converter 38.

An inner raceway 62 is formed on the inner rolling bearing ring 36 opposite the outer raceway 24 on the inside of the vehicle. The rolling bodies 16, 18 form, on the one hand, a first row of rolling bodies 16 that roll on the outer raceway 22 and the inner raceway 46 on the outside of the vehicle and, on the other hand, a second row of rolling bodies 18 that roll on the outer raceway 24 and the inner raceway 62 om the inside of the vehicle.

These two rows of rolling elements 16, 18 and the raceways 22, 24, 46, 62 are protected by two sealing devices, namely a sealing device 64 on the outside of the vehicle, positioned between the outer ring 20 and the wheel hub 34, and a sealing device 66 on the inside of the vehicle, positioned between the outer ring 20 and the inner bearing ring 36.

The components of the wheel bearing 10 described so far are generic, and can be presented in many variants. In particular, the inner raceway 46 can be formed on a bearing ring attached to the wheel hub 34. The inner ring 36 on the inside of the vehicle can be secured to the wheel hub 34 by a snap ring and, if necessary, have no contact with the torque converter 38. The torque converter 38 can be attached to the wheel hub 34 by any means. The bearing may comprise just one row of rolling elements 16, which may be balls or rollers.

Figure 2:
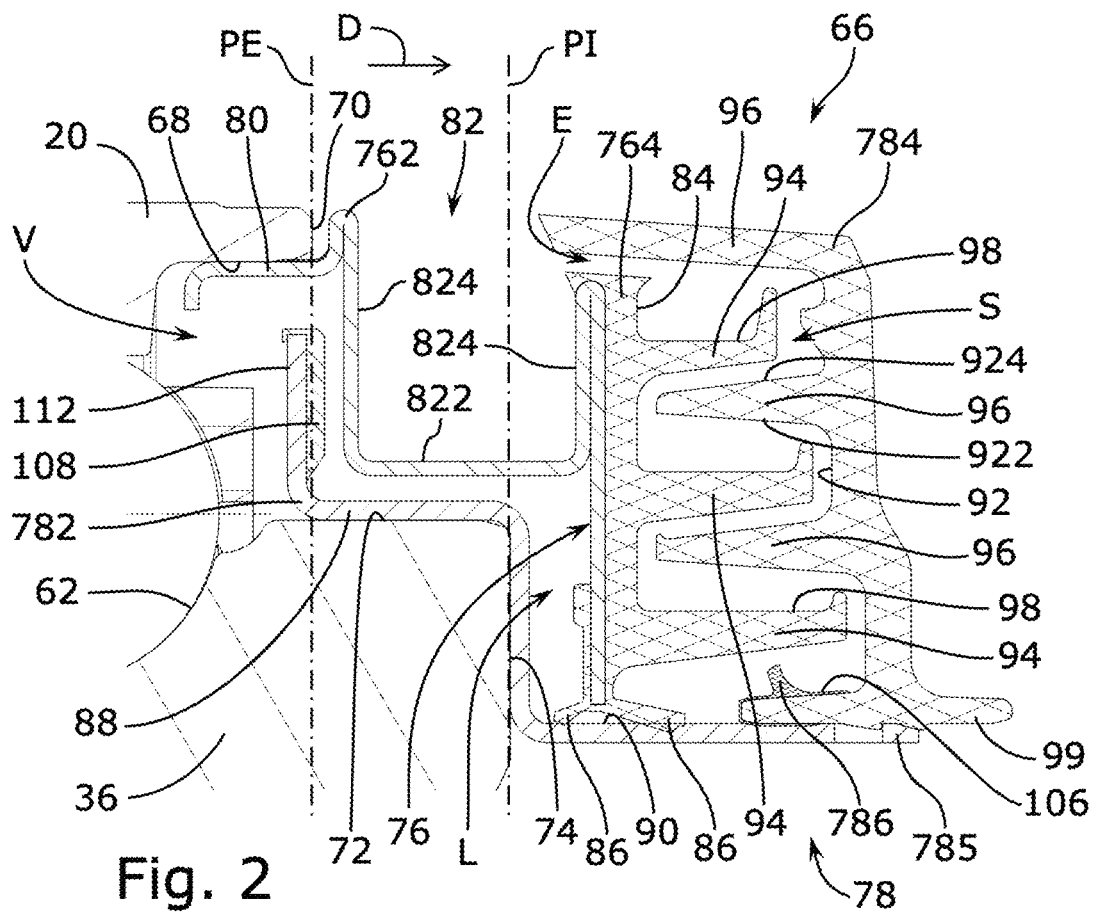
FIG. 2: A detailed view of certain components of the wheel bearing of FIG. 1.

We'll now take a closer look at the sealing device 66 situated on the inside of the vehicle, shown in detail on FIG. 2, which seals between the outer bearing ring 20 and the inner bearing ring 36, and more specifically protects a volume V situated between the raceway 24 of the outer ring 20 and the raceway 62 of the inner ring 36. In this region, the outer bearing ring 20 has a shrink-fit surface 68, which is cylindrical here and faces the axis of revolution XX, and an end wall 70, which defines a reference plane PE of the bearing outer ring 20, perpendicular to the axis of revolution XX and tangent to the end face 70. The shrink-fit surface 68 extends axially and circumferentially in an region of the outer ring 20 situated between the raceway 24 on the inside of the vehicle and the end face 70. The shrink-fit surface 68 on the outer ring is further away from the axis of revolution XX than a pitch circle C of the row of rolling elements 18, and, in this embodiment, further away from the axis of revolution XX than a raceway bottom FE of the raceway 24 of the outer ring 20.

The inner bearing ring 36 also has a shrink-fit face 72, which in this case is cylindrical and faces radially outwards, and an end wall 74, which defines a reference plane PI of the inner bearing ring 36, perpendicular to the axis of revolution XX and tangent to the end face 74. The shrink-fit surface 72 extends axially and circumferentially in an region of the inner ring situated between the raceway 62 on the inside of the vehicle and the end face 74. The end face 74 of the inner bearing ring and the end face 70 of the outer bearing ring are rotated in a common direction D parallel to the reference axis XX, which will be an axial reference direction for the remainder of the presentation. In this embodiment, it may be noted that the reference plane PI of the inner bearing ring 36 is situated at a distance from the reference plane PE of the outer bearing ring 20 and offset in the axial reference direction D, so that the inner bearing ring 36 protrudes from the outer bearing ring 20 in the axial reference direction D, and passes through the reference plane PE of the outer bearing ring 20. More specifically, at least part of the shrink-fit surface 72 of the inner bearing ring 36 is situated on one side of the reference plane PE of the outer bearing ring 20 opposite the shrink-fit surface 68 of the outer bearing ring 20.

The sealing device 66 comprises an outer structure 76 integral with the outer ring 20, and an inner structure 78 integral with the inner ring 36.

The outer structure 76 comprises a shrink-fitting portion 80 shrunk onto the shrink-fit surface 68 of the outer ring 20, and a functional portion forming a gutter 82 open radially outwards, a chicane wall 84 and, in this embodiment, two sealing lips 86. The gutter 82 has a bottom 822 and side walls 824, which are situated axially on either side of the bottom and are further from the axis of revolution than the bottom. In this embodiment, the outer structure 76 comprises a rigid frame 762, for example made of sheet metal or plastic, and an overmold 764. The frame 762 forms the shrink-fitting portion 80 and gutter 82, while the overmolding 764 forms the chicane wall 84 and seal lips 86.

The inner structure 78 comprises a shrink-fitting portion 88 shrunk onto the shrink-fit bearing surface 72 of the inner ring 36, and a functional portion forming a seal seat 90 and a chicane wall 92 situated opposite the chicane wall 84 of the outer structure 76 to delimit a chicane passage S between the inner structure 78 and the outer structure 76. The seal lips 86 are resiliently deformable and bear on the seal seat 90, which is cylindrical in this embodiment. The inner structure 78 and the outer structure 76 of the sealing device together delimit an annular housing L for the seal seat 90 and the seal lips 86, wherein the chicane passage S opens and which communicates with the internal volume V delimited by the raceway 24 of the outer bearing ring 20 and by the raceway 62 of the inner bearing ring 36.

The shrink-fitting portion 88 and the functional portion of the inner structure 78 lie on either side of the reference plane PI of the inner ring 36. This makes it possible to position the seal seat 90 closer to the axis of revolution XX than the shrink-fitting portion 88. This arrangement is designed to minimize the diameter of the seal seat 90, thereby minimizing the frictional torque between the seal lips 86 and seal seat 90, and reducing the heat generated by this friction.

The chicane passage S has an inlet E delimited by an inlet portion of the chicane wall 84 of the outer structure 76 and by an inlet portion of the chicane wall 92 of the inner structure 78. The inlet E of the chicane passage S and the shrink-fitting portion 80 of the outer structure 76 are situated axially on either side of the gutter 82. The chicane passage S and the gutter 82 are situated on the same side of the reference plane PE of the outer ring 20, opposite the side of the reference plane PE on which the shrink-fitting portion 80 of the outer structure 76 is situated. The inlet of the chicane passage is further from the axis of revolution XX than the seal seat 90.

The chicane wall 84 of the outer structure 76 is formed by annular ribs 94 which project axially towards the chicane wall 92 of the inner structure 78. Similarly, the chicane wall 92 of the inner structure 78 is formed by several annular ribs 96, which project axially towards the chicane wall 84 of the outer structure 76 and are interposed in interspaces between the annular ribs 94 of the outer structure 76. The annular ribs 94 of the outer structure 76 form several additional gutters 98 situated inside the chicane passage S. At the annular ribs 96 of the inner structure 78, the chicane wall 92 has frustoconical facets 922 facing the axis of revolution and frustoconical walls 924 facing radially outwards.

The inlet E of the chicane passage S is annular and faces in an axial direction opposite the reference axial direction D, towards the outer bearing ring 20. The inlet E is further from the axis of revolution XX than the bottom 822 of the gutter 82. In this case, the inlet E is preferably further from the axis of revolution XX than the pitch circle C defined by the row of rolling elements 18.

The inlet portion of the chicane wall 92 of the inner structure 78 is preferably frustoconical as shown, so as to converge towards an apex further from the outer ring reference plane PE than the inlet E. Similarly, the inlet portion of the chicane wall 84 of the outer structure 76 is preferably frustoconical as shown in the figures, so as to converge towards an apex further from the outer ring reference plane PE than the inlet E.

In this embodiment, it can be seen that the gutter 82 at least partially overlaps axially with the shrink-fit surface 72 of the bearing inner ring 36 and with the shrink-fitting portion 88 of the inner structure 78. The chicane wall 84 of the outer structure 76 is situated entirely on one side of the reference plane PI of the inner bearing ring 36, and entirely on one side of the gutter 82, so that the gutter 82 is situated axially between the shrink-fitting portion 80 of the outer structure 76 and the chicane wall 84 of the outer structure 76.

Optionally, the functional portion of the inner structure 78 can also form a seat 99 or a support for a static seal 102 cooperating directly or indirectly with a flared median portion 52 of the torque converter 38 and/or an interface for attaching a protective sleeve 104 of the torque converter 38.

Figure 3:
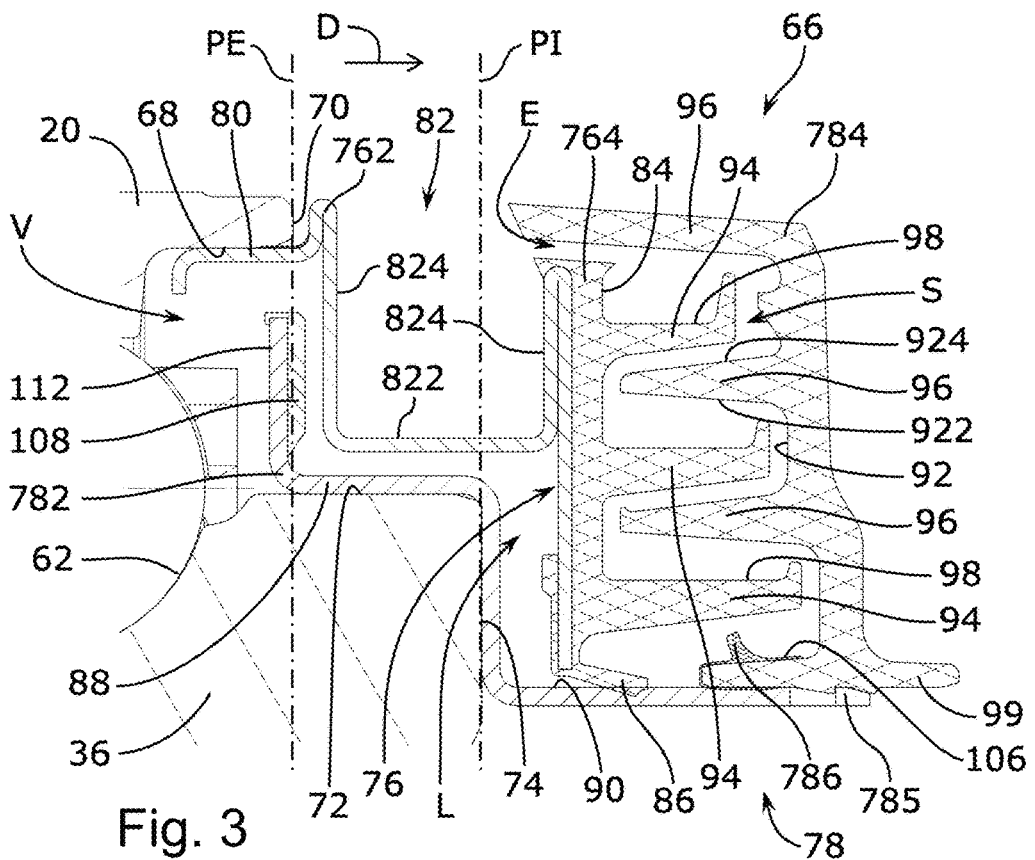
FIG. 3: A detailed view of certain components of a wheel bearing according to a second embodiment of the invention.

The inner structure 78 of the sealing device 66 comprises a frame 782, preferably metal, which forms the shrink-fitting portion 72 and may also form the seal seat 90. Alternatively, the seal seat 90 can be formed on an annular part attached to the frame 782, which may or may not be made of a non-metallic material. Preferably, the inner structure 78 also comprises a second part 784 attached to a connection portion 785 of the frame 782 by any suitable means, in particular by gluing, overmolding or mechanical fastening, for example by shrinking or by fastening elements, or, as shown in FIGS. 1, 2 and 3, by resilient hooking. The connecting portion 785 of frame 782 here projects axially from seal seat 90 in reference direction D. The second part 784 may be made of plastic. It acts as a deflector, forming the chicane wall 92 of the inner structure and, where appropriate, the seat 99 or the support for static seal 102, or even the static seal 102 itself. In the embodiment shown in FIGS. 1 and 2, a third part 786, together with the second part 784, defines an additional gutter 106 close to the seal seat 90.

In a variant not shown, the part forming the deflector can also form the seal seat.

In the embodiment shown in FIGS. 1 and 2, the inner structure 78 also supports a preferably annular encoder 108, positioned opposite a side wall 824 or the bottom 822 of the gutter 82, and which may in particular be a multipolar magnetic encoder or a phonic wheel. With a sensor 110 penetrating locally into the gutter 82, data, in particular position data, encoded on the encoder 108 can be read remotely through the wall 824 of the gutter 82. The reading can be radial if the encoder 108 is positioned on the shrink-fitting portion 88 of the inner structure 78, and if the shrink-fit is controlled so as not to induce uncontrolled deformation of the encoder 108. Alternatively, and preferably, reading is axial, as shown in FIGS. 1 and 2, in which case the encoder 108 is supported by a flat annular flange 112 projecting radially from the shrink-fitting portion 88 towards the outer bearing ring 20. It should be noted that even in the absence of an encoder 108, the flat annular flange 112, positioned opposite and at a short distance from the side wall 824, can be advantageous, in that it enables grease to be confined within the volume V, allowing, if necessary, one of the seal lips 86 to be eliminated and thus contributing to a reduction in friction torque.

FIG. 3 shows a further variant, which differs from the embodiment shown in FIGS. 1 and 2 in the shape of the seal, which has only one seal lip 86.

Figure 4:
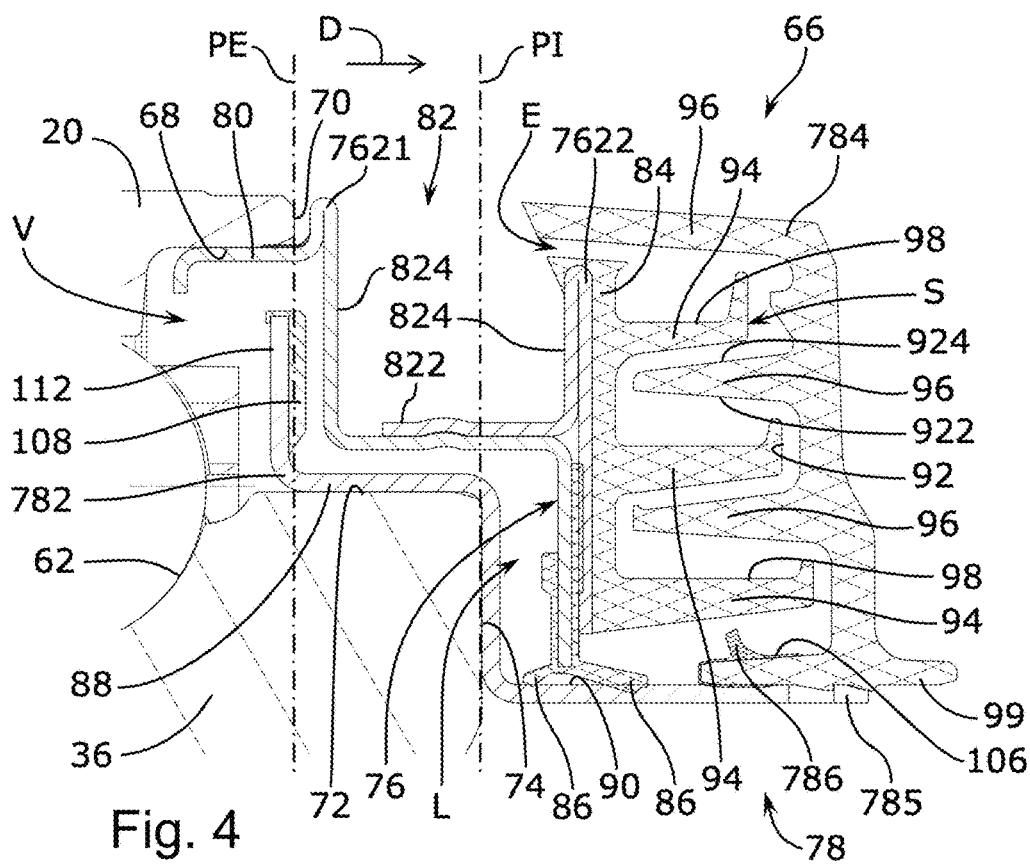
FIG. 4: A detailed view of certain components of a wheel bearing according to a third embodiment of the invention.

FIG. 4 shows another variant, which differs from the embodiment shown in FIGS. 1 and 2 in that the frame 762 of the outer structure 76 of the sealing device consists of two parts 7621, 7622 fastened together by any suitable means, in this case by shrink-fitting and mechanical interlocking.

In a variant not shown, the seal seat can have a flat annular face parallel to the reference plane of the inner ring, the outer structure of the sealing device then comprising a seal lip bearing axially against this flat face.

In a variant not shown, the outer ring's shrink-fit surface 68 is further away from the axis of revolution XX than the pitch circle C of the row of rolling elements 18, and closer to the axis of revolution XX than a raceway bottom FE of the raceway 24 of the outer ring 20.

The examples shown in the figures and discussed above are provided for illustrative purposes only. It is explicitly provided that it is possible to combine the various illustrated embodiments in order to provide others.

It is emphasized that all the features, as they become apparent to a person skilled in the art from the present description, drawings and attached claims, even if in concrete terms they have only been described in connection with other specific features, both individually and in any combinations, may be combined with other features or groups of features disclosed herein, provided that this has not been expressly excluded or that technical circumstances render such combinations impossible or meaningless.

The invention claimed is:

1. A wheel bearing comprising:
at least one outer ring; and
at least one inner ring, which are guided relative to one another about an axis of rotation of the wheel bearing, the wheel bearing further comprising:
a sealing device, the sealing device comprising at least one outer structure attached to the outer ring and an inner structure attached to the inner ring, the outer structure and the inner structure together delimiting a chicane passage having an inlet, the outer structure having a shrink-fitting portion shrink-fitted onto the outer ring, the inner structure having a shrink-fitting portion shrink-fitted onto a shrink-fit surface of the inner ring, the outer structure forming an annular gutter open radially outwards, the inlet of the chicane passage and the shrink-fitting portion of the outer structure being situated axially on either side of the gutter, the chicane passage and the gutter being situated on a same first side of a reference plane of the outer ring, perpendicular to the axis of revolution and tangent to an end wall of the outer ring, the shrink-fitting portion of the outer structure and the outer ring being situated on a second side of the reference plane of the outer ring, opposite the first side, the gutter having a bottom and side walls situated axially on either side of the bottom, the side walls being further away from the axis of revolution than the bottom, wherein the inner structure comprises a flat annular flange projecting radially from the shrink-fitting portion of the inner structure towards the outer ring, positioned axially opposite and at a distance from one of the side walls of the gutter such that the flat annular flange and the one side wall radially overlap.

2. The wheel bearing of claim 1, wherein the chicane passage is delimited by a chicane wall of the outer structure and a chicane wall of the inner structure, comprising at least one of:
the chicane wall of the outer structure is situated axially between the reference plane of the outer ring and the chicane wall of the inner structure;

the gutter is situated axially between the shrink-fitting portion of the outer structure and the chicane wall of the outer structure;

the chicane wall of the outer structure forms at least three additional gutters situated inside the chicane passage;

the chicane wall of the inner structure forms at least two frustoconical walls facing the axis of revolution, each converging towards an apex further from the reference plane than the inlet;

the chicane wall of the outer structure forms at least three annular ribs of the outer structure, and the chicane wall of the inner structure forms at least three annular ribs of the inner structure which are interposed in interspaces between the annular ribs of the outer structure; and an inlet portion of the chicane wall of the inner structure is frustoconical and converges towards an apex further from the reference plane of the outer ring than the inlet.

3. The wheel bearing of claim 1, wherein the inlet faces axially towards the gutter.

4. The wheel bearing of claim 1, wherein the bottom of the gutter is closer to the axis of revolution than the inlet, the inlet opening onto a radially outer periphery of one of the side walls of the gutter.

5. The wheel bearing of claim 1, wherein the outer ring forms at least one raceway, the inner ring forming at least one raceway situated opposite the raceway of the outer ring and delimiting with the raceway of the outer ring an inner volume of the wheel bearing open onto a sealing volume delimited by the outer structure of the sealing device and by the inner structure of the sealing device, the wheel bearing comprising at least one row of rolling bodies able to roll on the raceway of the outer ring and the raceway of the inner ring so as to allow a relative rotational movement between the inner ring and the outer ring about an axis of revolution, the inlet of the chicane passage being further from the axis of revolution than a pitch circle defined by the row of rolling elements.

6. The wheel bearing of claim 5, wherein the sealing device further comprises at least one resiliently deformable seal lip, the seal lip being attached to a first of the inner structure or the outer structure and coming into sliding contact against a seal seat formed by a second of the inner structure or the outer structure, the seal lip and the seal seat being situated in the sealing volume.

7. The wheel bearing of claim 6, comprising at least two of:

the seal seat is closer to the axis of revolution than the inlet of the chicane passage;

the seal seat is closer to the axis of revolution than the pitch circle defined by the row of rolling bodies;

the seal seat is closer to the axis of revolution than a raceway bottom of the inner ring raceway;

the seal seat is closer to the axis of revolution than the shrink-fitting portion of the inner structure; and the seal lip is situated on the first side of the reference plane of the outer ring.

8. The wheel bearing of claim 5, wherein the shrink-fitting portion of the outer structure is shrink-fitted onto a shrink-fit surface of the outer ring facing radially towards the axis of revolution and situated axially between the raceway of the outer ring and the reference plane of the outer ring.

9. The wheel bearing of claim 1, wherein the outer structure comprises a frame, forming the shrink-fitting portion of the outer structure.

10. The wheel bearing of claim 9, wherein the frame forms the gutter.

11. The wheel bearing of claim 1, wherein the inner ring has an axial end face facing in an axial reference direction, the axial end face of the inner ring projecting relative to the axial end face of the outer ring in the axial reference direction.

12. The wheel bearing of claim 11, wherein the gutter is situated axially on either side of a reference plane of the inner ring, perpendicular to the axis of revolution and tangent to the axial end face of the inner ring.

13. The wheel bearing of claim 1, comprising at least one of:

the outer ring has an interface for attachment to a strut, the inner bearing ring forms a wheel hub or is provided with an interface for attachment to a wheel hub, the shrink-fitting portion of the outer structure is cylindrical; and the outer ring is single-piece.

\* \* \* \* \*